US009333989B2

(12) United States Patent
Donabedian et al.

(10) Patent No.: US 9,333,989 B2
(45) Date of Patent: May 10, 2016

(54) VEHICLE FRAME BRACKET

(71) Applicant: Ford Global Technologies, LLC, Dearborn, MI (US)

(72) Inventors: Edgar Edward Donabedian, Livonia, MI (US); Darrin Neil Wagner, Bloomfield Hills, MI (US); Leonard Anthony Shaner, New Baltimore, MI (US); Fungtai Charles Ko, Novi, MI (US); Dragan B. Stojkovic, Taylor, MI (US); Colleen Marie Hoffman, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 70 days.

(21) Appl. No.: 14/314,466

(22) Filed: Jun. 25, 2014

(65) Prior Publication Data

US 2015/0375793 A1    Dec. 31, 2015

(51) Int. Cl.
*B62D 21/15* (2006.01)
*B62D 27/02* (2006.01)
*B62D 21/02* (2006.01)
*B62D 25/04* (2006.01)
*B62D 25/08* (2006.01)

(52) U.S. Cl.
CPC .............. *B62D 27/023* (2013.01); *B62D 21/02* (2013.01); *B62D 25/04* (2013.01); *B62D 25/082* (2013.01)

(58) Field of Classification Search
CPC .................................................... B62D 21/152
USPC ................ 296/187.09, 187.1, 193.09, 203.02
See application file for complete search history.

(56) References Cited

U.S. PATENT DOCUMENTS

| 4,545,612 | A | * | 10/1985 | Harasaki ................... 296/203.02 |
| 4,560,198 | A | * | 12/1985 | Katano et al. ............ 296/203.02 |
| 4,699,419 | A | * | 10/1987 | Kawase et al. ................ 296/192 |
| 5,031,958 | A | * | 7/1991 | Fujita et al. .............. 296/203.02 |
| 5,042,872 | A | * | 8/1991 | Yoshii ....................... 296/203.02 |
| 5,052,742 | A | * | 10/1991 | Akoshima et al. ............ 296/192 |
| 6,209,950 | B1 | * | 4/2001 | Hanyu ...................... 296/203.02 |
| 6,250,710 | B1 | * | 6/2001 | Matsuzaki ............... 296/203.02 |
| 6,322,134 | B1 | * | 11/2001 | Yang ........................ 296/203.02 |
| 7,036,874 | B2 | | 5/2006 | Stojkovic et al. |
| 7,090,273 | B2 | | 8/2006 | Stojkovic et al. |
| 8,201,873 | B2 | | 6/2012 | Nishimura et al. |
| 8,205,925 | B2 | * | 6/2012 | Hattori ............................ 296/30 |
| 8,550,545 | B1 | * | 10/2013 | Stojkovic et al. ......... 296/193.09 |
| 8,651,563 | B2 | * | 2/2014 | Mildner et al. .......... 296/203.02 |
| 8,833,832 | B2 | * | 9/2014 | Whipps ............................ 296/29 |

(Continued)

FOREIGN PATENT DOCUMENTS

| EP | 1065137 | A2 | * | 1/2001 |
| JP | 04011580 | A | * | 1/1992 |

(Continued)

*Primary Examiner* — H Gutman
(74) *Attorney, Agent, or Firm* — Jason C. Rogers; Bejin Bieneman PLC

(57) ABSTRACT

A frame portion for a vehicle includes a pillar component extending along a first direction and a beam component at least partially extending along a second direction substantially orthogonal to the first direction. The beam component has a rear end proximate the pillar component. The frame portion further includes a bracket coupled between the pillar component and the rear end of the beam component. The bracket spaces the beam component from the pillar component.

16 Claims, 2 Drawing Sheets

(56) References Cited

U.S. PATENT DOCUMENTS

| | | | |
|---|---|---|---|
| 9,033,400 B2* | 5/2015 | Sasaki et al. | 296/187.09 |
| 9,102,359 B2* | 8/2015 | Stojkovic et al. | |
| 9,132,865 B2* | 9/2015 | Chung et al. | |
| 2008/0150326 A1* | 6/2008 | Maruyama et al. | 296/192 |
| 2009/0315364 A1* | 12/2009 | Stojkovic et al. | 296/193.09 |
| 2013/0062911 A1* | 3/2013 | Takeuchi et al. | 296/203.02 |
| 2015/0048649 A1* | 2/2015 | Stojkovic et al. | 296/187.1 |
| 2015/0210330 A1* | 7/2015 | Ezzat et al. | |

FOREIGN PATENT DOCUMENTS

| | | | |
|---|---|---|---|
| JP | 04059489 A | * | 2/1992 |
| JP | 04254264 A | * | 9/1992 |
| JP | H5-85415 | | 4/1993 |
| JP | 2010-83182 | | 4/2010 |
| KR | 10-2013-0117029 | | 10/2013 |
| WO | WO 2009019384 A2 | * | 2/2009 |

* cited by examiner

VEHICLE FRAME BRACKET

BACKGROUND

Vehicle frames include components proximate the vehicle occupant cabin, as well as members extending to the extremities of the vehicle. In many conditions, it is desirable to avoid or inhibit transfer of a load applied to the vehicle, e.g. in an impact, to vehicle frame components and other vehicle components proximate to and within the vehicle occupant cabin. However, in order to achieve a sufficient stiffness characteristics for the respective vehicles, vehicle frame components, including those components proximate the vehicle occupant cabin, are typically fixed to one another at relatively robust joints. Accordingly, selectively managing load transfers between particular vehicle frame components, in a frame meeting typical stiffness requirements for vehicles, is currently difficult.

DRAWINGS

DETAILED DESCRIPTION

Figure 1:
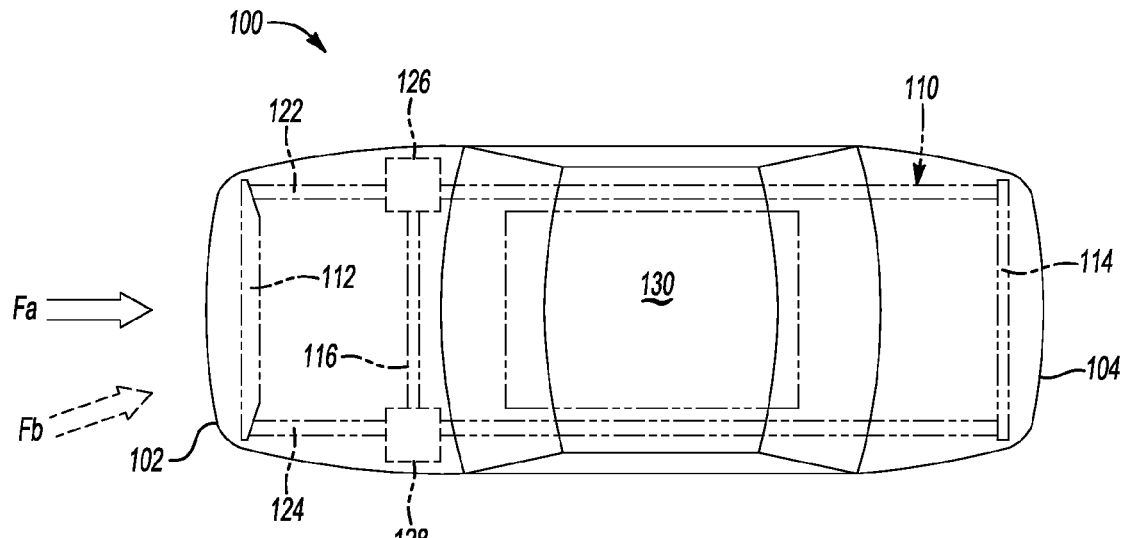
FIG. 1 is a top view of an exemplary vehicle.

FIG. 1 is a top view of an exemplary vehicle 100, such as, for example, a passenger car, truck, sport utility vehicle, or van. The exemplary vehicle 100 includes a front end 102 and a rear end 104. The vehicle 100 includes a frame 110 extending therewithin. The frame 110 includes a front bumper beam 112 extending substantially laterally across the vehicle 100 proximate the front end 102 and a rear bumper beam 114 extending substantially laterally across the vehicle 100 proximate the rear end 104. The frame 110 further includes an instrument panel beam 116 also extending laterally across the vehicle 100, longitudinally in-between the front and rear bumper beams 102, 104. The frame 110 further includes right and left shotgun beam components 122, 124 extending substantially longitudinally in positions generally between the front bumper beam 102 and the instrument panel beam 116 proximate opposing sides of the vehicle 100. The frame 110 also includes right and left hinge pillar components 126, 128 extending in a substantially vertical direction relative to the vehicle 100. As described herein, the right and left shotgun beam components 122, 124 are coupled to the right and left hinge pillar components 126, 128, respectively.

The hinge pillar components 126, 128 are located forward of and proximate to an occupant cabin 130 for the vehicle 100. Accordingly, the instrument panel beam 116 may also be coupled between the right and left hinge pillar components 126, 128, as the instrument panel beam 116 supports control and safety devices such as the steering wheel (not shown) and passenger airbags (not shown) for use in the occupant cabin 130. Additionally, components such as the passenger and driver side doors (not shown) may be rotatably coupled to the right and left hinge pillar component 126, 128.

Figure 2:
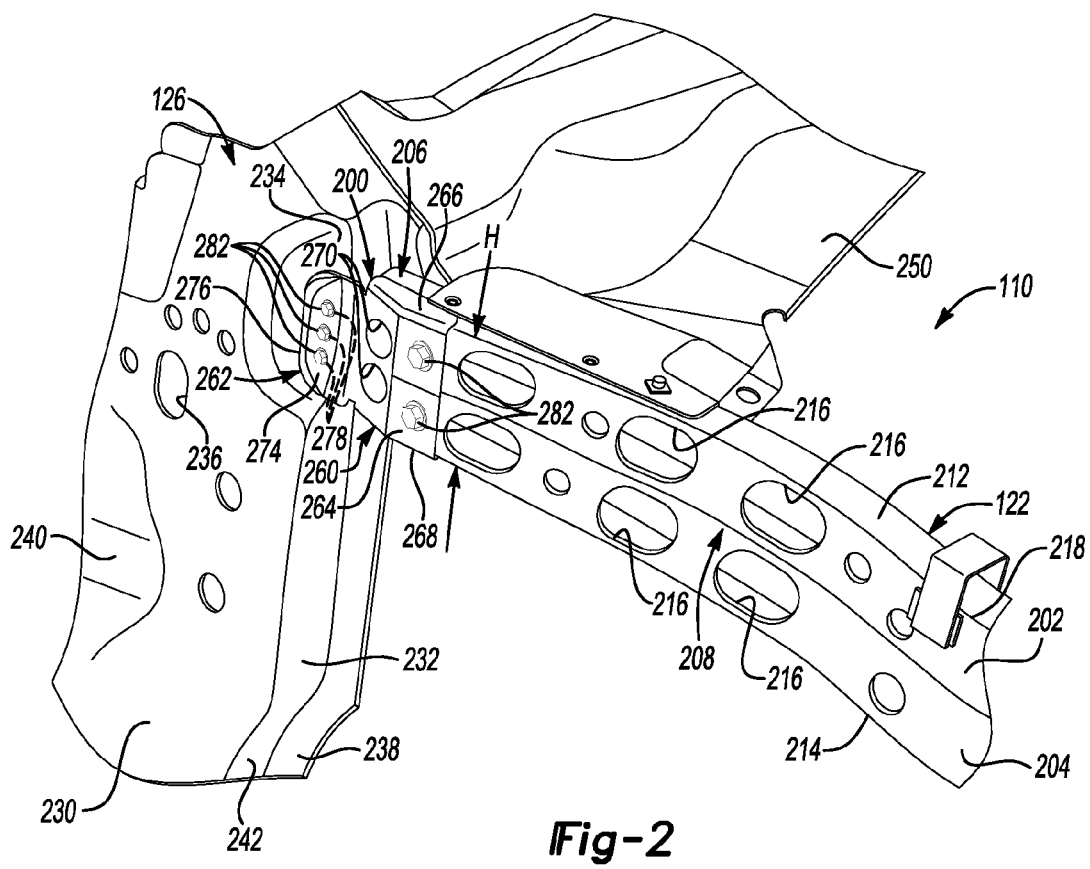
FIG. 2 is a perspective view of a portion of an exemplary vehicle frame structure.

FIG. 2 is a perspective view of a portion of the exemplary frame 110 of the vehicle 100, including the right shotgun beam component 122, the right hinge pillar component 126, and a bracket 200 coupling the right shotgun beam component 122 and the right hinge pillar component 126 according to the principles of the present disclosure. It should be understood that the description herein of right shotgun beam component 122 and the right hinge pillar component 126, as well as the bracket 200 coupling those components, applies to the left shotgun beam component 124 and the left hinge pillar component 128, and a bracket connecting those components (not shown), with the understanding that the laterally outside surfaces of the right shotgun beam component 122, the right hinge pillar component 126 and the bracket 200, on one hand, and the left shotgun beam component 124, the left hinge pillar component 128 and the bracket connecting those components, on the other, respectively face opposite directions extending laterally away from the right and left sides of the vehicle 100.

Figure 4:
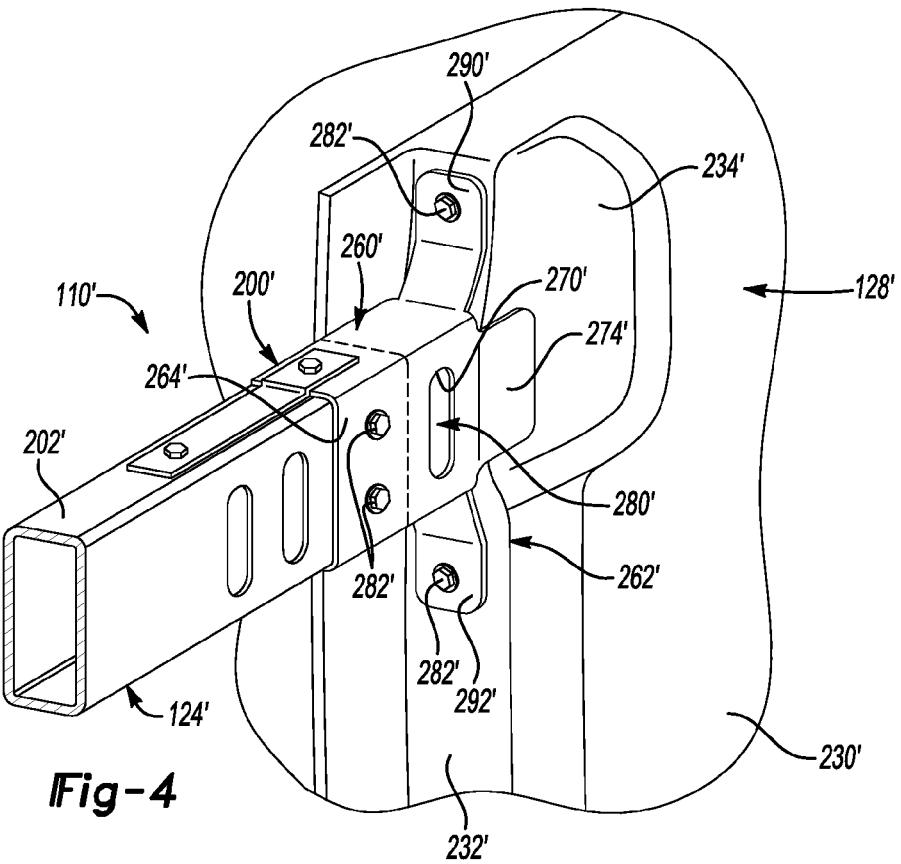
FIG. 4 is a perspective view of a portion of another exemplary vehicle frame structure.

In this exemplary implementation, the right shotgun beam component 122 includes first and second beam members 202, 204 aligned with each other. It should be understood that the configuration of the shotgun beam components may vary according to the particular characteristics of the vehicle 100; e.g., for a relatively more heavy duty vehicle, such as a truck, a shotgun beam component may include multiple members, such as the right shotgun beam component 122 including first and second beam members 202, 204. In another example, for a vehicle with no extraordinary loading characteristics, such as a compact passenger sedan, a shotgun beam component may include a single member (FIG. 4).

Figure 3:
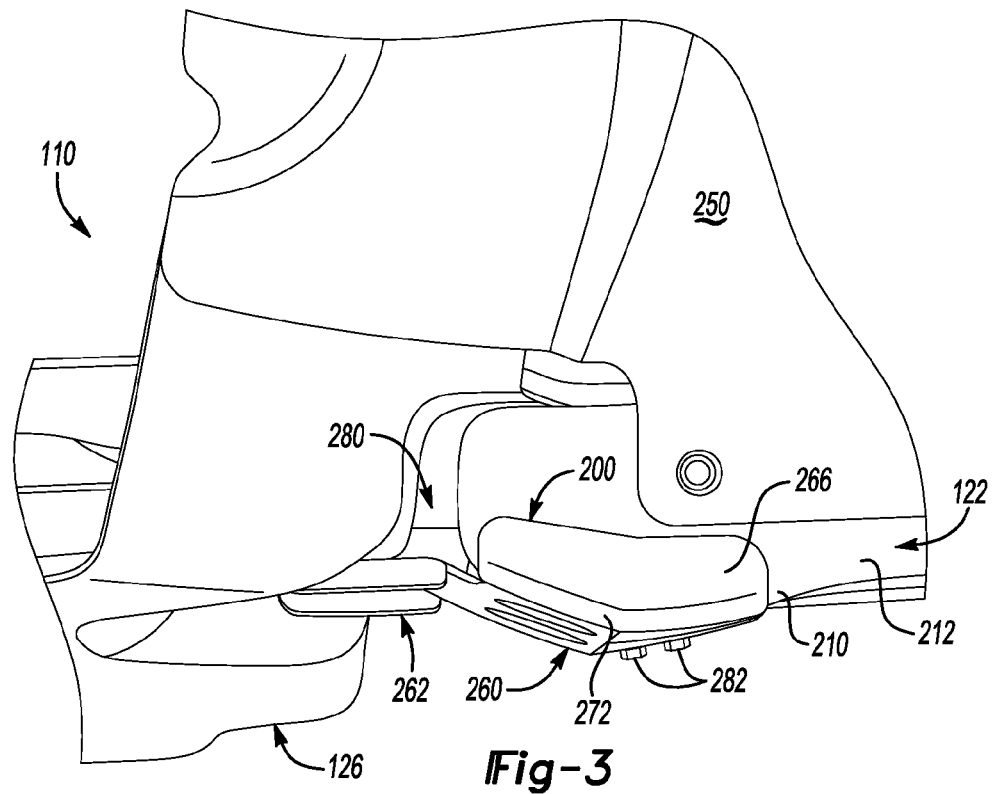
FIG. 3 is a top view of the exemplary vehicle frame structure portion of FIG. 2.

With additional reference to FIG. 3, which is a top view of the exemplary portion of the frame 110 of FIG. 2, the first and second beam members 202, 204 terminate at a rear end 206 of the right shotgun beam component 122. The right shotgun beam component 122 includes a laterally outside surface 208 and a bulge 210, proximate the rear end 206, extending from the surface 208 laterally away from the vehicle 100. The right shotgun beam component 122 includes a top surface 212 and a bottom surface 214 and defines a height H therebetween proximate the rear end 206. The right shotgun beam component further includes a plurality of apertures 216 extending in the laterally outsides surface 208 in each of the first and second beam members 202, 204, and a contour 218 collectively defined by the first and second beam members 202, 204. Features of the right shotgun beam component 122, e.g., the bulge 210 and the contour 218, may facilitate lateral displacement of the right shotgun beam component 122 away from the right hinge pillar component 126—and the occupant cabin 130—upon deformation of the frame 110 at the bracket 200.

The right hinge pillar component 126 includes a laterally outside surface 230 and a front longitudinal surface 232. The right hinge pillar component 126 includes a recess 234 defined in the laterally outside surface 230 and extending laterally inwardly. It should be understood that the configuration of hinge pillar components, such as the right hinge pillar component 126, may vary according to the particular characteristics and requirements of the vehicle 100. For example, the right hinge pillar component 126 may include structural features such as apertures 236, longitudinally forward-extending flange 238, lateral contour 240 and longitudinal contour 242, in furtherance of supporting, cooperating with and/or coupling to additional components of the vehicle 100, such as, e.g., a body component 250. As illustrated in FIGS. 2-3, components of the vehicle 100, such as the body component 250, may also engage each of the right hinge pillar component 126 and the right shotgun component 122.

The bracket 200 coupling the right shotgun beam component 122 and the right hinge pillar component 126 according to the principles of the present disclosure generally includes a longitudinally forward shotgun portion 260 and a longitudinally rearward hinge pillar portion or flange 262. The shotgun portion 260 of the bracket 200 includes a main body 264 extending along the vertical direction and complementary to the laterally outside surface 208 of the right shotgun beam component 122. The shotgun portion 260 of the bracket 200 further includes laterally inwardly-extending top and bottom flanges 266, 268 extending from opposing vertical ends of the main body 264. The main body 264 and the top and bottom flanges 266, 268 define a C-shape complementary to the right shotgun beam component 122, with the top and bottom flanges 266, 268 complementary to and engaging the top and bottom surfaces 212, 214 of the right shotgun beam component 122, respectively. The bracket 200 includes apertures 270 extending through the main body 264 of the shotgun portion 260, and a contour 272 extending laterally outwardly, complementary to the bulge 210 of the right shotgun beam component 122. The apertures 270 may provide access to the rear end 206 of the right shotgun beam component 122, to facilitate a variety of assembly options for the vehicle 100.

The hinge pillar portion or flange 262 of the bracket 200 includes a main body 274, a lateral flange 276 and apertures 278. It should be understood that the portions of the bracket 200 may be coupled in a variety of ways; for example, the shotgun and hinge pillar portions 260, 262 may be integrally formed or bonded together.

The right shotgun beam component 122, the right hinge pillar 126 and the bracket 200 may be formed from any appropriate material, such as aluminum or steel, to thereby securely support the corresponding components of the vehicle 100 and manage the forces and stresses transferred through the frame 110 under desired performance characteristics.

The bracket 200 couples the shotgun beam component 122 and the hinge pillar 126 relative to one another with a space 280 (FIG. 3) defined therebetween. According to the principles of the present disclosure, upon deformation of the frame 110 at the bracket 200, e.g. in response to a certain frontal impact force such as Fa or Fb (FIG. 1) on the vehicle 100, the space 280 provides the right shotgun beam component 122 room to laterally deflect away from the right hinge pillar component 126, to inhibit transfer of the impact force to the right hinge pillar component 126 and, thus, to the occupant cabin 130.

The bracket 200 is secured to the shotgun beam component 122 and the hinge pillar 126, respectively, with one or more joining components. In one example, as illustrated in FIG. 2, joining components in the form of fasteners 282 couple the bracket 200 to the shotgun beam component 122 and the hinge pillar 126, respectively. In other examples, in addition to joining components in the form of fasteners, the bracket 200 may be secured to the shotgun beam component 122 and/or the hinge pillar 126 with joining components in the form of adhesive materials and welds. The joining components, such as fasteners 282, adhesive materials and/or welds, are configured with a deformation threshold less than the right hinge pillar component 126 and the right shotgun beam component 122 to facilitate selective deformation of the frame 110 at the bracket 200. As such, the deformation characteristics of the joining components and the components of the frame 110 may be particularly determined, or tuned, to manage the location of deformation of the frame 110 under certain loading conditions, e.g. from an impact with the vehicle 100, and facilitate a desired dissipation of energy, e.g. displacement and/or deformation of components of vehicle 100 separate and apart from the occupant cabin 130.

While the joining components are configured with a deformation threshold less than the respective hinge pillar, shotgun beam, and bracket components, the joining components, such as fasteners 282, may also provide sufficient stiffness to maintain or meet durability and impact performance characteristics for the frame 110. For example, the fasteners 282 may be in the form of M6 or M8 bolts, to provide the joint or coupling between the right shotgun beam component 122 and the right hinge pillar component 126 with the strength—up to the deformation threshold of the bolts—to meet stiffness requirements. Furthermore, loading conditions outside of stiffness requirements may exceed the strength of the bolts and deform the frame 110 at the bracket 200. The joining components may include any one of, or a combination of, a variety of mechanical fasteners, adhesive materials, and other bonds such as welds, to address the particular performance characteristics, such as stiffness requirements, of the particular vehicle 100.

FIG. 4 is a perspective view of a portion of another exemplary frame structure 110'. It should be understood that the description herein of the frame 110, and the components thereof, applies to the frame 110', unless otherwise stated herein. The frame 110' includes a left shotgun beam component 124', including a single beam member 202', a left hinge pillar component 128' with a laterally outside surface 230' and a recess 234', and a bracket 200' coupling the left shotgun beam component 124' and the left hinge pillar component 128'.

The bracket 200' includes a shotgun portion 260' and a hinge pillar portion 262'. The shotgun portion 260' includes a main body 264' having an aperture 270' therethrough. The hinge pillar portion 262' includes a main body 274' configured to extend along the laterally outside surface 230' of the left hinge pillar component 128'. The hinge pillar portion 262' of the bracket 200' also includes top and bottom bodies 290', 292'. The top and bottom bodies 290', 292' are configured to extend across and engage a front longitudinal face 232' of the left hinge pillar component 128'.

The bracket 200' couples the left shotgun beam component 124' and the left hinge pillar component 128' with a space 280' therebetween. The bracket 200' is secured to the left shotgun beam component 124' and the left hinge pillar component 128', respectively, with one or more joining components as described herein, e.g. fasteners 282'.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It should be understood that, as used herein, exemplary refers to serving as an illustration or specimen, illustrative, or typical. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A frame portion for a vehicle, comprising:
   a pillar component extending along a first direction;
   a beam component at least partially extending along a second direction substantially orthogonal to the first direction, the beam component having a rear end proximate the pillar component;
   a bracket coupled between the pillar component and the rear end of the beam component, the bracket spacing the beam component from the pillar component;
   wherein the bracket includes at least a first portion engaging the pillar component, the first portion extending substantially across the first and second directions;
   wherein the pillar component includes a recess extending substantially across the first and second directions complementary to a first flange of the bracket; and
   wherein the first direction is configured substantially along a vertical direction of a vehicle, the second direction is configured substantially along a longitudinal direction of the vehicle, and the recess is defined within a laterally outside surface of the pillar component.

2. The frame portion of claim 1, wherein the bracket includes a second portion engaging the pillar component, the first and second portions extending substantially across the first direction and a third direction, the third direction being substantially orthogonal to each of the first and second directions.

3. The frame portion of claim 1, wherein the bracket is configured to engage a plurality of surfaces of the beam component.

4. The frame portion of claim 1, wherein the bracket is coupled to at least one of the pillar component and the beam component with a joining component, the joining component configured with a deformation threshold less than the pillar component and the beam component to facilitate selective deformation of the frame portion at the bracket.

5. The frame portion of claim 4, wherein the joining component includes at least one of a mechanical fastener, an adhesive material, and a weld between the bracket and the at least one of the pillar component and the beam component.

6. The frame portion of claim 1, wherein the beam component includes a pair of beam members aligned with each other.

7. A frame portion for a vehicle, comprising:
   a pillar component extending along a first direction;
   a beam component at least partially extending along a second direction substantially orthogonal to the first direction, the beam component having a rear end proximate the pillar component; and
   a bracket coupled between the pillar component and the rear end of the beam component, the bracket coupled to at least one of the pillar component and the beam component with a joining component, the joining component configured with a deformation threshold less than the pillar component and the beam component to facilitate selective deformation of the frame portion at the bracket.

8. The frame portion of claim 7, wherein the bracket spaces the beam component from the pillar component.

9. The frame portion of claim 8, wherein the bracket includes at least a first flange engaging the pillar component.

10. The frame portion of claim 9, wherein the first flange extends substantially across the first and second directions.

11. The frame portion of claim 10, wherein the pillar component includes a recess extending substantially across the first and second directions complementary to the first flange.

12. The frame portion of claim 11, wherein the first direction is configured substantially along a vertical direction of a vehicle, the second direction is configured substantially along a longitudinal direction of the vehicle, and the recess is defined within a laterally outside surface of the pillar component.

13. The frame portion of claim 9, wherein the bracket includes a second flange, the first and second flanges extending substantially across the first direction and a third direction, the third direction being substantially orthogonal to each of the first and second directions.

14. The frame portion of claim 9, wherein the bracket is configured to engage a plurality of surfaces of the beam component.

15. The frame portion of claim 7, wherein the joining component includes at least one of a mechanical fastener, an adhesive material, and a weld between the bracket and the at least one of the pillar component and the beam component.

16. The frame portion of claim 7, wherein the beam component includes a pair of beam members aligned with each other.

* * * * *